(12) United States Patent
Kim

(10) Patent No.: US 9,996,896 B2
(45) Date of Patent: Jun. 12, 2018

(54) DISPLAY COMPENSATION METHOD, DISPLAY COMPENSATION MODULE AND DISPLAY APPARATUS

(71) Applicant: BOE Technology Group Co., Ltd., Beijing (CN)

(72) Inventor: Heecheol Kim, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days. days.

(21) Appl. No.: 15/307,570

(22) PCT Filed: Oct. 23, 2015

(86) PCT No.: PCT/CN2015/092681
§ 371 (c)(1),
(2) Date: Oct. 28, 2016

(87) PCT Pub. No.: WO2016/184034
PCT Pub. Date: Nov. 24, 2016

(65) Prior Publication Data
US 2017/0186131 A1    Jun. 29, 2017

(30) Foreign Application Priority Data
May 20, 2015    (CN) .......................... 2015 1 0259989

(51) Int. Cl.
*G06T 3/00*    (2006.01)
(52) U.S. Cl.
CPC .................. *G06T 3/0093* (2013.01)
(58) Field of Classification Search
CPC .................................................. G06T 3/0093
See application file for complete search history.

(56) References Cited

U.S. PATENT DOCUMENTS

2002/0085119 A1    7/2002    Van Overveld et al.
2003/0234799 A1    12/2003    Lee
(Continued)

FOREIGN PATENT DOCUMENTS

CN    101072293 A    11/2007
CN    101933082 A    12/2010
(Continued)

OTHER PUBLICATIONS

Feb. 25, 2016—(WO)—International Search Report and Written Opinion Appl PCT/CN2015/092681 with English Tran.
(Continued)

*Primary Examiner* — Michael Teitelbaum
(74) *Attorney, Agent, or Firm* — Banner & Witcoff, Ltd.

(57) ABSTRACT

There are provided a display compensation method, a display compensation module and a display apparatus. The method comprises following steps: receiving an image signal to be displayed (S1); obtaining a user position (S2) which is a relative position of a user relative to a the display apparatus; compensating for the image signal to be displayed according to the user position to obtain a compensated image signal (S3); and outputting the compensated image signal (S4). The display compensation method, the display compensation module and the display apparatus can be used for manufacturing the display, and can avoid the image distortion occurred to the image viewed by the user due to the different distances from the user to respective points on the display such that the user's experience in the display effect of the display can be raised.

7 Claims, 5 Drawing Sheets

(56) References Cited

U.S. PATENT DOCUMENTS

| | | | | |
|---|---|---|---|---|
| 2010/0322315 | A1* | 12/2010 | Hasuo | H04N 19/139 375/240.16 |
| 2013/0044124 | A1* | 2/2013 | Reichert, Jr. | G06T 3/00 345/618 |
| 2014/0313230 | A1* | 10/2014 | Suggs | G06T 3/00 345/648 |

FOREIGN PATENT DOCUMENTS

| | | |
|---|---|---|
| CN | 104011766 A | 8/2014 |
| CN | 104125495 A | 10/2014 |
| CN | 104869325 A | 8/2015 |
| WO | 2010118292 A1 | 10/2010 |

OTHER PUBLICATIONS

Jun. 19, 2017—(CN) First Office Action 201510259989.2 with English Tran.
Nov. 21, 2017—(WO) English Translation of International Preliminary Report on Patentability application PCT/CN2015/092681.

\* cited by examiner

DISPLAY COMPENSATION METHOD, DISPLAY COMPENSATION MODULE AND DISPLAY APPARATUS

The application is a U.S. National Phase Entry of International Application No. PCT/CN2015/092681 filed on Oct. 23, 2015, designating the United States of America and claiming priority to Chinese Patent Application No. 201510259989.2 filed on May 20, 2015. The present application claims priority to and the benefit of the above-identified applications and the above-identified applications are incorporated by reference herein in their entirety.

TECHNICAL FIELD

The present disclosure relates to a display compensation method, a display compensation module, and a display apparatus.

BACKGROUND

A display has already been applied widely by various electronic devices, for example, being widely applied in a mobile phone, a personal digital assistant (PDA), a digital camera, a computer screen or a notebook computer screen, and a large-size display has become one of major characteristics of the electronic devices gradually.

When a user views an image through a display, the image viewed by the user will be distorted because distances from the user to respective points on the display are not completely the same. This is the result that eyes of human beings are equivalent to a convex lens when viewing an object. The size of the object imaged in the eyes is determined depending on an included angle between two ends of the object and the eyes. The larger the included angle is, the larger the image in the eyes is, while the smaller the included angle is, the smaller the image in the eyes is. As a result, in the case of viewing objects having the same size, when the viewer has a close distance from the object, a larger image would be taken on; when the viewer has a far distance from the object, a smaller image would be taken on. When the size of the display is very large or the distance from the user to the display is very close, a distance from a point on the display that is close to the user to the position of the user and a distance from a point on the display that is far from the user to the position of the user would have a great difference, such that the image viewed by the user will be distorted, thereby influencing the user's experience in the display effect of the display.

SUMMARY

There are provided in embodiments of the present disclosure a display compensation method, a display compensation module and a display apparatus, which are used to solve the problem that an image viewed by a user is distorted because the distances from the user to respective points on the display are different, which influences the user's experience in the display effect of the display.

According to a first aspect of the present disclosure, there is provided a display compensation method, comprising:
receiving an image signal to be displayed;
obtaining a user position, which is a relative position of a user relative to a display apparatus;
compensating for the image signal to be displayed according to the user position to obtain a compensated image signal; and
outputting the compensated image signal.

Optionally, the compensating for the image signal to be displayed according to the user position to obtain a compensated image signal comprises:
converting the image signal to be displayed into a plurality of sub-image blocks to be displayed;
compensating for the plurality of sub-image blocks to be displayed according to the user position to obtain compensated sub-image blocks; and
obtaining a compensated image signal according to the compensated sub-image blocks.

Optionally, the compensating for the plurality of sub-image blocks to be displayed according to the user position to obtain compensated sub-image blocks comprises:
obtaining a distance from each of the sub-image blocks to be displayed to the user position according to the user position, wherein the distance from the sub-image blocks to be displayed to the user position is a distance from a center point of a geometry graphic of the sub-image block to be displayed that covers the display to the user position; and
compensating for the plurality of sub-image blocks to be displayed respectively according to the distance and a preset formula to obtain compensated sub-image blocks.

Optionally, the preset formula comprises:

$$A = \left[P \times \left(\frac{a}{b} - 1\right) + 1\right] \times B;$$

where a is a distance from a sub-image block to be displayed, which is compensated for, to the user position; b is a distance from a sub-image block to be displayed, which has a maximum distance to the user position, to the user position; P is a compensation coefficient, $0 \leq P \leq 1$; B is an area size of the sub-image block to be displayed, which has a maximum distance to the user position; A is an area size of a compensated sub-image block to be displayed which is compensated for.

According to a second aspect of the present disclosure, there is provided a display compensation module, comprising:
a receiving unit, configured to receive an image signal to be displayed;
a detecting unit, configured to obtain a user position, which is a relative position of a user relative to a display apparatus;
a compensating unit, configured to compensate for the image signal to be displayed according to the user position to obtain a compensated image signal; and
an outputting unit, configured to output the compensated image signal.

Optionally, the compensating unit comprises:
a converting sub-unit, configured to convert the image signal to be displayed into a plurality of sub-image blocks to be displayed;
a processing sub-unit, configured to compensate for the plurality of sub-image blocks to be displayed according to the user position to obtain compensated sub-image blocks; and
an obtaining sub-unit, configured to obtain a compensated image signal according to the compensated sub-image blocks.

Optionally, the processing sub-unit is configured to obtain a distance from each of sub-image blocks to be displayed to the user position according to the user position, wherein the distance from the sub-image block to be displayed to the user position is a distance from a center point of a geometry graphic of the sub-image block to be displayed that covers the display to the user position; and compensate for the plurality of sub-image blocks to be displayed respectively according to the distance and a preset formula to obtain compensated sub-image blocks.

Optionally, the preset formula comprises:

$$A = \left[P \times \left(\frac{a}{b} - 1\right) + 1\right] \times B;$$

where a is a distance from a sub-image block to be displayed, which is compensated for, to the user position; b is a distance from a sub-image block to be displayed, which has a maximum distance to the user position, to the user position; P is a compensation coefficient, $0 \leq P \leq 1$; B is an area size of the sub-image block to be displayed which has a maximum distance to the user position; A is an area size of a compensated sub-image block to be displayed which is compensated for.

According to a third aspect of the present disclosure, there is provided a display apparatus, comprising the display compensation module described above.

Optionally, the display apparatus comprises a display panel, and the display compensation module is located in a non-display area on the display panel.

The display compensation method, the display compensation module and the display apparatus provided in the embodiments of the present disclosure are capable of obtaining the relative position of the user relative to the display, and compensating for the image signal to be displayed according to the relative position of the user relative to the display, and thus can avoid the problem that image distortion occurs to the image viewed by the user because the distances from the user to respective points on the display are different, such that the embodiments of the present disclosure can raise the user's experience in the display effect of the display.

DETAILED DESCRIPTION

Technical solutions of embodiments in the present disclosure will be described below clearly and completely by combining with accompany figures. Obviously, the embodiments described below are just a part of embodiments of the present disclosure, but not all the embodiments. Based on the embodiments in the present disclosure, all the other embodiments obtained by those ordinary skilled in the art without paying any inventive labor belong to the scope sought for protection in the present disclosure.

In description of the embodiments of the present disclosure, it needs to understand that orientations or position relationships indicated by terms of "center", "upper", "lower", "front", "back", "left", "right", "vertical", "horizontal", "top", "bottom", "inside" and "outside", etc. are orientations or position relationships as shown in the figures, and these terms are just used to describe the embodiments of the present disclosure and simplify the description, instead of indicating or suggesting the apparatus or element referred by must have a specific orientation and must be established and operated in a specific direction, and thus cannot be understood as a limitation to the present disclosure.

Figure 1:
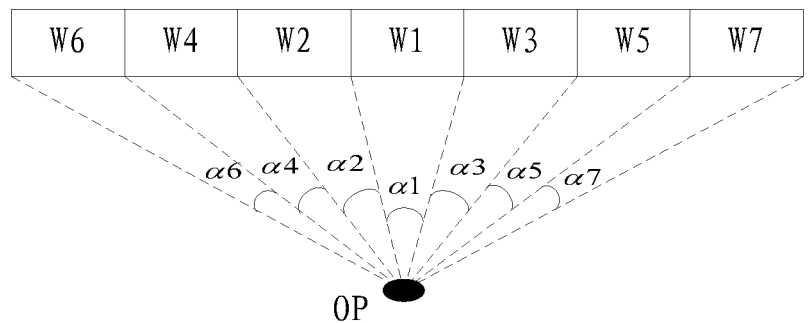
FIG. 1 is a schematic diagram of viewing angles when a user views objects located at different positions and having same size.

FIG. 1 shows a schematic diagram of viewing angles when a user views objects located at different positions and having a same size.

As shown in FIG. 1, W1, W2, W3, W4, W5, W6, and W7 are objects having the same size. Point OP is a place where a viewer is located. The distance relationship between the objects W1-W7 and point P is W1>W2=W3>W4=W5>W6=W7. Included angles formed between two ends of the objects W1-W7 and the point OP are α1, α2, α3, α4, α5, α6, α7, respectively, and their magnitude relationship is α1>α2=α3>α4=α5>α6=α7.

Figure 2:
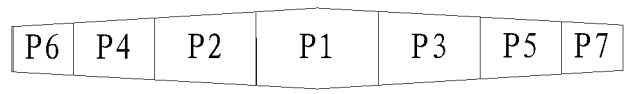
FIG. 2 is a schematic diagram of images of the objects viewed by the user in FIG. 1.

FIG. 2 shows a schematic diagram of images of the objects viewed by the user in FIG. 1.

As shown in FIG. 2, the objects W1-W7 are displayed in eyes of the viewer as P1, P2, P3, P4, P5, P6, P7, respectively, and their magnitude relationship is P1>P2=P3>P4=P5>P6=P7.

Figure 3:
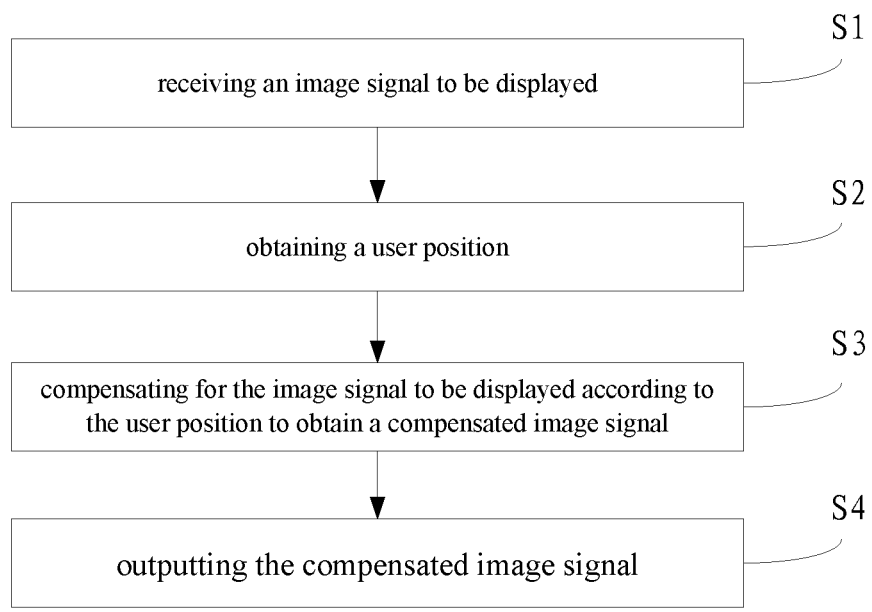
FIG. 3 is a flow diagram of a display compensation method provided in an embodiment of the present disclosure.

FIG. 3 shows a flow diagram of a display compensation method provided in an embodiment of the present disclosure.

As shown in FIG. 3, according to the display compensation method provided in the embodiment of the present disclosure, the operation process of the method is described as follows:

in step S1, receiving an image signal to be displayed;

in step S2, obtaining a user position, which is a relative position of a user relative to a display apparatus.

Figure 4:
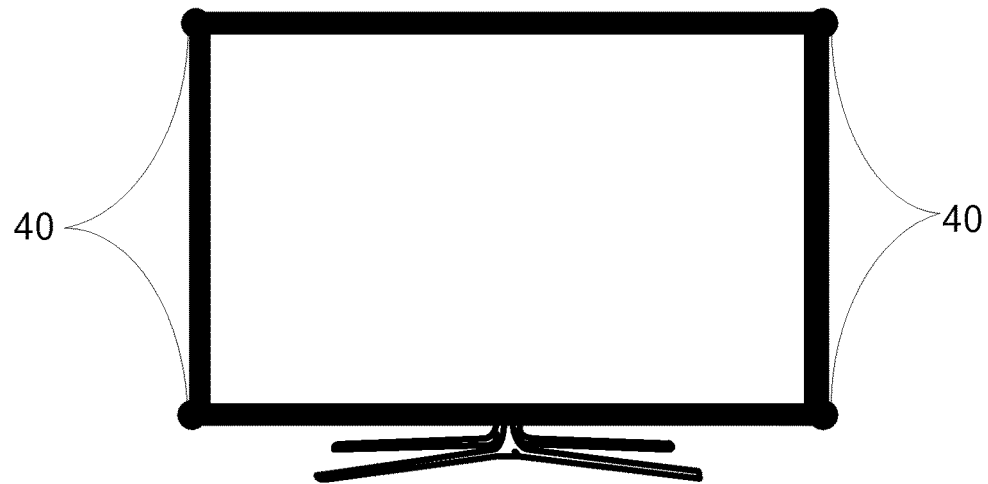
FIG. 4 is a schematic diagram of a structure of an apparatus for obtaining a user position provided in an embodiment of the present disclosure.

FIG. 4 shows a schematic diagram of a structure of an apparatus for obtaining a user position provided in an embodiment of the present disclosure.

Exemplarily, as shown in FIG. 4, the user position can be obtained by cameras 40 which are configured to obtain a user image and installed respectively at four corners of the display. When obtaining the user position, the cameras 40 obtain the user image respectively, and then obtain the user position by analyzing and processing the user image. Of course, other methods can also be used to obtain the user position, for example, by means of a sensor or an infrared sensor and so on.

Returning to the display compensation method as shown in FIG. 3, in step S3, the image signal to be displayed is compensated for according to the user position to obtain a compensated image signal.

In step S4, the compensated image signal is output.

The display compensation method provided in the embodiment of the present disclosure is capable of obtaining the relative position of the user relative to the display, and compensating for the image signal to be displayed according to the relative position of the user relative to the display, and thus can avoid the problem that image distortion occurs to the image viewed by the user because the distances from the user to respective points on the display are different, such that the embodiments of the present disclosure would raise the user's experience in the display effect of the display.

In particular, for example, in step S3, compensating for the image signal to be displayed according to the user position to obtain the compensated image signal can comprise following sub-steps:

S31, converting the image signal to be displayed into a plurality of sub-image blocks to be displayed.

Exemplarily, an area of the sub-image block to be displayed can be equal to an area of one pixel point on the display, i.e., converting the image signal to be displayed into a plurality of sub-image blocks to be displayed, whose number is the same as the number of pixel points on the display. For example, if the number of displayed pixel points is 1024*768, then the image signal to be displayed is converted into 1024*768 sub-image blocks to be displayed. Of course, other solutions can also be used to convert the image signal to be displayed into a plurality of sub-image blocks to be displayed. For example, the image signal to be displayed is converted into a plurality of rectangle sub-image blocks to be displayed in a column direction, or the image signal to be displayed is converted into a plurality of rectangle sub-image blocks to be displayed in a horizontal direction.

S32, compensating for the plurality of sub-image blocks to be displayed respectively according to the user position to obtain compensated sub-image blocks.

In particular, in step S32, compensating for the plurality of sub-image blocks to be displayed according to the user position to obtain compensated sub-image blocks comprises:

S321, obtaining a distance from each of sub-image blocks to be displayed to the user position according to the user position, wherein the distance from the sub-image block to be displayed to the user position is a distance from a center point of a geometry graphic of the sub-image block to be displayed that covers the display to the user position; and S322, compensating for the plurality of sub-image blocks to be displayed according to the distance and a preset formula.

Exemplarily, the preset formula can be as follows:

$$A = \left[P \times \left(\frac{a}{b} - 1\right) + 1\right] \times B;$$

where a is a distance from a sub-image block to be displayed which is compensated for to the user position; b is a distance from a sub-image block to be displayed, which has a maximum distance to the user position, to the user position; P is a compensation coefficient, $0 \leq P \leq 1$; B is an area size of the sub-image block to be displayed which has a maximum distance to the user position; A is an area size of a compensated sub-image block to be displayed, which is compensated for.

S33, obtaining a compensated image signal according to the compensated sub-image blocks.

Figure 5:
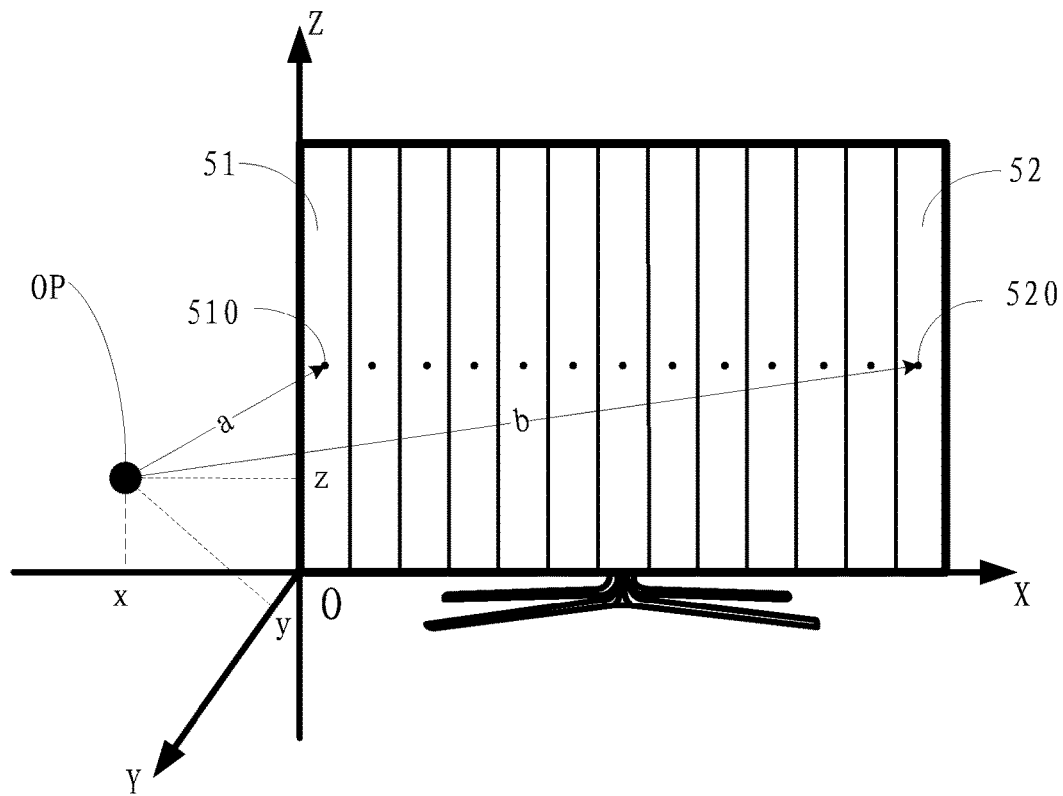
FIG. 5 is a schematic diagram of converting an image signal to be displayed into a plurality of sub-image blocks to be displayed provided in an embodiment of the present disclosure.

FIG. 5 shows a schematic diagram of converting an image signal to be displayed into a plurality of sub-image blocks to be displayed provided in an embodiment of the present disclosure.

As shown in FIG. 5, OP represents a user position, 51 represents sub-image blocks to be displayed which is compensated for, 52 represents a sub-image block to be displayed which has a maximum distance to the user position, 510 represents a center point of a geometry graphic of the sub-image block to be displayed 51 on the display covering the display, and 520 represents a center point of a geometry graphic of the sub-image block to be displayed 52 on the display covering the display, in FIG. 5. By taking point 0 at a lower left corner of the display as an origin point of the Cartesian coordinate system, projections of point OP on axes X, Y, and Z are x, y, and z respectively, then a coordinate of point OP in the Cartesian coordinate system is (x, y, z). a represents a distance from 510 to OP, and b represents a distance from 520 to OP. FIG. 5 is described by taking the image signal to be displayed being divided into a plurality of rectangle sub-image blocks to be displayed in the column direction and the user being located at left side of the display as an example.

After the image signal to be displayed is converted into a plurality of sub-image blocks to be displayed, an area size of any one of the sub-image blocks to be displayed can be obtained through the size of the display. Then, the above data is brought into the preset formula $$A = \left[P \times \left(\frac{a}{b} - 1\right) + 1\right] \times B,$$

thereby obtaining an area size of compensated sub-image blocks to be displayed.

In the above formula, because of $$b \geq a, 0 \leq P \times \left(\frac{a}{b} - 1\right) + 1 \leq 1.$$

It can be known from $$0 \le P \times \left(\frac{a}{b} - 1\right) + 1 \le 1$$

that the closer the distance from the sub-image blocks to be display to the user position is, the larger the area size of the compensated sub-image blocks to be displayed is.

Figure 6:
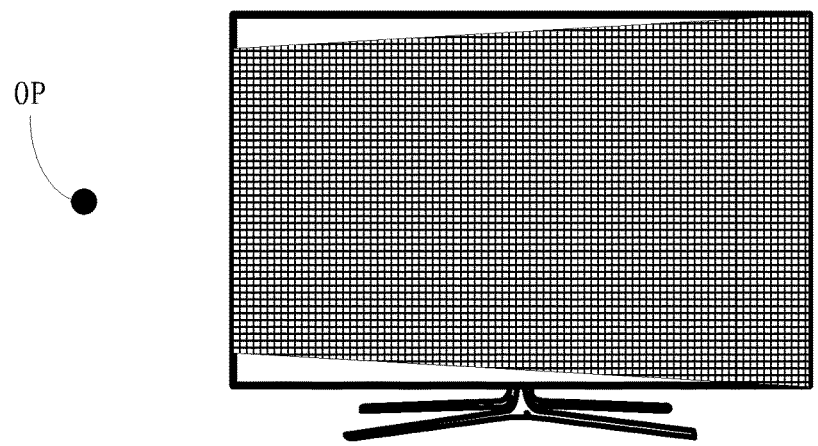
FIG. 6 is a schematic diagram of a display effect of a compensated display signal when a user position is located at left side of a display provided in an embodiment of the present disclosure.

FIG. 6 shows a schematic diagram of a display effect of a compensated display signal when a user position is located at left side of a display provided in an embodiment of the present disclosure.

Figure 7:
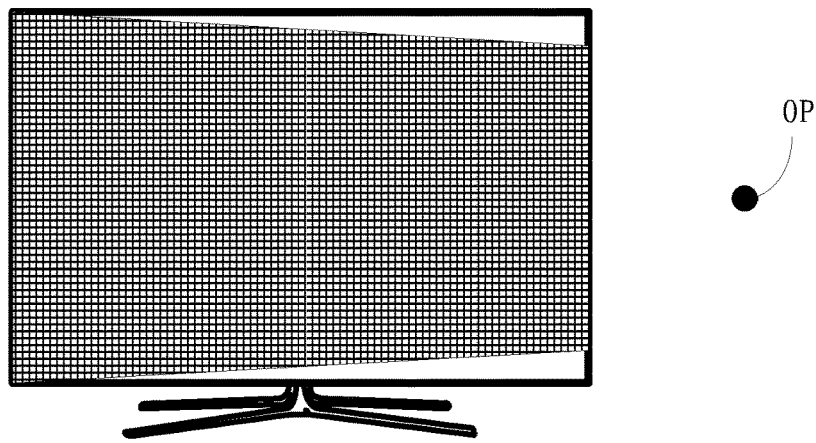
FIG. 7 is a schematic diagram of a display effect of a compensated display signal when a user position is located at right side of a display provided in an embodiment of the present disclosure.
Figure 8:
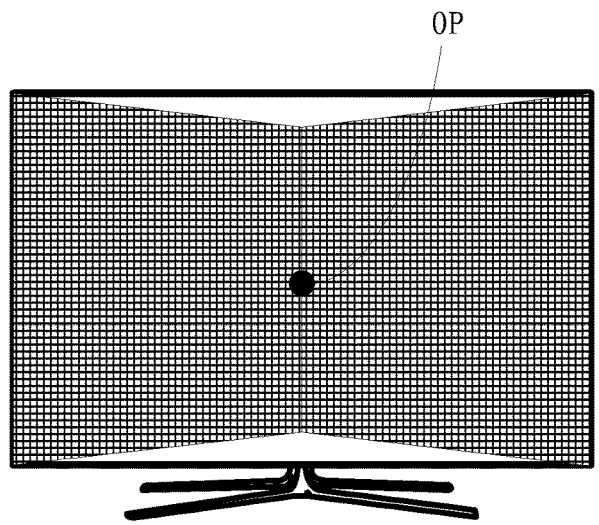
FIG. 8 is a schematic diagram of a display effect of a compensated display signal when a user position is located at center of a display provided in an embodiment of the present disclosure.
Figure 9:
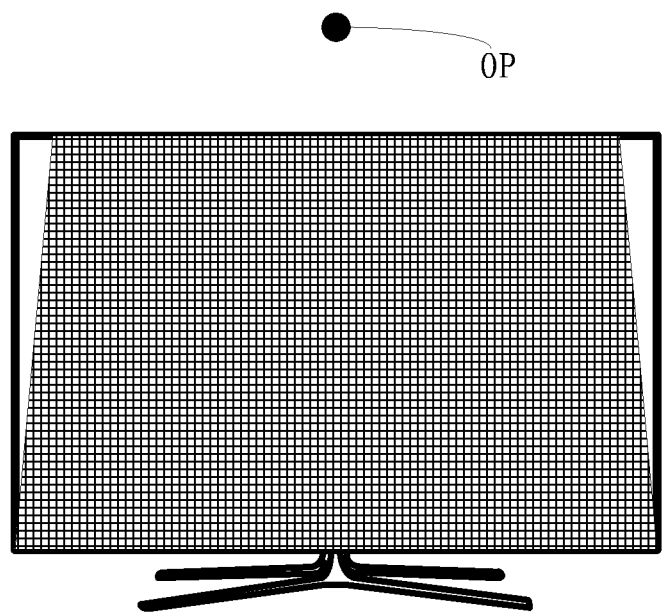
FIG. 9 is a schematic diagram of a display effect of a compensated display signal when a user position is located at upper side of a display provided in an embodiment of the present disclosure.
Figure 10:
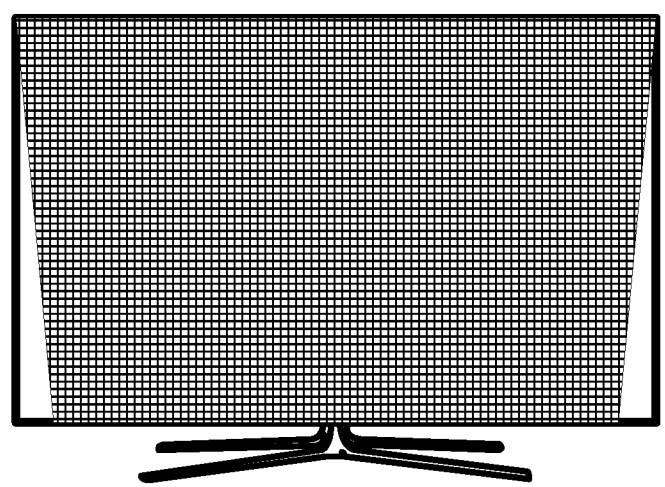
FIG. 10 is a schematic diagram of a display effect of a compensated display signal when a user position is located at lower side of a display provided in an embodiment of the present disclosure.

Referring to FIG. 6, it shows the display effect of the compensated display signal when a user is located at left side of the display, wherein the display image is reduced gradually from right to left. In addition, FIG. 7 shows a schematic diagram of a display effect of a compensated display signal when a user position is located at right side of the display provided in an embodiment of the present disclosure; FIG. 8 shows a schematic diagram of a display effect of a compensated display signal when a user position is located at center of the display provided in an embodiment of the present disclosure; FIG. 9 shows a schematic diagram of a display effect of a compensated display signal when a user position is located at upper side of the display provided in an embodiment of the present disclosure; FIG. 10 shows a schematic diagram of a display effect of a compensated display signal when a user position is located at lower side of the display provided in an embodiment of the present disclosure.

As shown in FIGS. 7, 8, 9, and 10, OP in the figures represents the user position. Herein, FIG. 7 is the display effect of the compensated display signal when a user position is located at right side of the display, wherein the display image is reduced gradually from left to right. FIG. 8 is the display effect of the compensated display signal when a user position is located at center of the display, wherein the display image is reduced gradually from two sides to the center. FIG. 9 is the display effect of the compensated display signal when a user position is located at upper side of the display, wherein the display image is reduced gradually from lower to upper. FIG. 10 is the display effect of the compensated display signal when a user position is located at lower side of the display, wherein the display image is reduced gradually from upper to lower.

Figure 11:
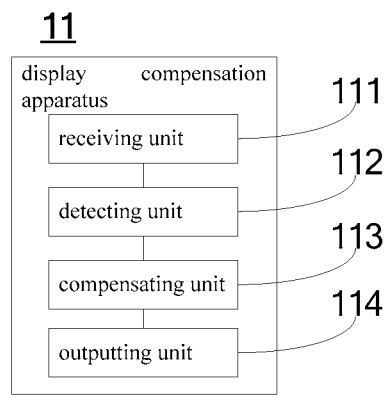
FIG. 11 is a schematic diagram of a structure of a display compensation module provided in an embodiment of the present disclosure.

FIG. 11 shows a schematic diagram of a structure of a display compensation module provided in an embodiment of the present disclosure.

There is provided in an embodiment of the present disclosure a display compensation module 11, which is used to realize the display compensation method provided in the above embodiment. As shown in FIG. 11, the display compensation module comprises:

a receiving unit 111, configured to receive an image signal to be displayed;

a detecting unit 112, configured to obtain a user position which is a relative position of a user relative to a display apparatus;

a compensating unit 113, configured to compensate for the image signal to be displayed according to the user position to obtain a compensated image signal; and an outputting unit 114, configured to output the compensated image signal.

The display compensation module provided in the embodiment of the present disclosure is capable of obtaining the relative position of the user relative to the display, and compensating for the image signal to be displayed according to the relative position of the user relative to the display, and thus can avoid the problem that image distortion occurs to the image viewed by the user because the distances from the user to respective points on the display are different, such that the embodiment of the present disclosure would raise the user's experience in the display effect of the display.

Figure 12:
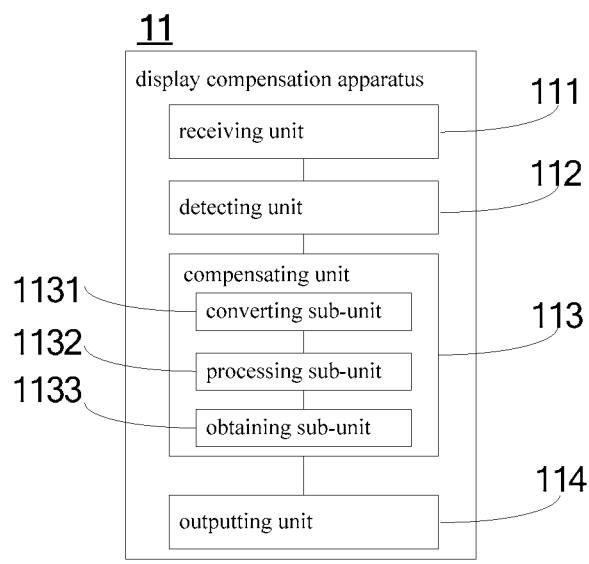
FIG. 12 is a schematic diagram of a structure of another display compensation module provided in an embodiment of the present disclosure.

FIG. 12 shows a schematic diagram of a structure of another display compensation module provided in an embodiment of the present disclosure.

Optionally, as shown in FIG. 12, the compensating unit 113 can comprise:

a converting sub-unit 1131, configured to convert the image signal to be displayed into a plurality of sub-image blocks to be displayed;

a processing sub-unit 1132, configured to compensate for the plurality of sub-image blocks to be displayed respectively according to the user position to obtain compensated sub-image blocks; and an obtaining sub-unit 1133, configured to obtain a compensated image signal according to the compensated sub-image blocks.

Optionally, the processing sub-unit 1132 can be configured to obtain a distance from each of sub-image blocks to be displayed to the user position according to the user position, wherein the distance from the sub-image block to be displayed to the user position is a distance from a center point of a geometry graphic of the sub-image block to be displayed that covers the display to the user position.

Exemplarily, the preset formula can comprise:

$$A = \left[P \times \left(\frac{a}{b} - 1\right) + 1\right] \times B;$$

where a is a distance from a sub-image block to be displayed which is compensated for to the user position; b is a distance from a sub-image block to be displayed, which has a maximum distance to the user position, to the user position; P is a compensation coefficient, $0 \le P \le 1$; B is an area size of the sub-image block to be displayed which has a maximum distance to the user position; A is an area size of a compensated sub-image block to be displayed which is compensated for.

There is provided in an embodiment of the present disclosure a display apparatus, comprising the display compensation module provided in any one of the embodiments described above.

In addition, the display apparatus can be any product or components having a display function, such as an electronic paper, a mobile phone, a tablet computer, a television set, a display, a notebook computer, a digital photo frame, and a navigator and so on.

The display apparatus provided in the embodiment of the present disclosure is capable of obtaining the relative position of the user relative to the display, and compensating for the image signal to be displayed according to the relative position of the user relative to the display, and thus can avoid the problem that image distortion occurs to the image viewed by the user because the distances from the user to respective points on the display are different, such that the embodiment of the present disclosure would raise the user's experience in the display effect of the display.

Further, the display apparatus comprises a display panel, and the display compensation module is located in a non-display area of the display panel.

Exemplarily, the receiving unit, the compensating unit and the obtaining unit of the display compensation module can be arranged in a black matrix region of the display apparatus, and the detecting unit of the display compensation module can be arranged on a frame of the display apparatus. The display compensation module located in the non-display area of the display apparatus enables that the normal display of the display apparatus would not be influenced. In addition, the display compensation module located in the non-display area of the display panel enables manufacturing the display compensation module in synchronous with the process of manufacturing the display panel, which simplifies the manufacturing process of the display compensation module.

The above description is just specific implementations of the present disclosure. However, the protection scope of the present disclosure is not limited thereto. Any alternation or replacement easily conceived by those skilled in the art which are familiar with the technical field within the technical scope of the present disclosure would be covered within the protection scope of the present disclosure. Therefore, the protection scope of the present disclosure shall be subjected to the protection scope of the Claims.

The present application claims the priority of a Chinese patent application No. 201510259989.2 filed on May 20, 2015. Herein, the content disclosed by the Chinese patent application is incorporated in full by reference as a part of the present disclosure.

What is claimed is:

1. A display compensation method, comprising:
receiving an image signal to be displayed;
obtaining a user position which is a relative position of a user relative to a display apparatus;
compensating for the image signal to be displayed according to the user position to obtain a compensated image signal; and
outputting the compensated image signal,
wherein the compensating for the image signal to be displayed according to the user position to obtain the compensated image signal comprises:
converting the image signal to be displayed into a plurality of sub-image blocks to be displayed;
compensating for the plurality of sub-image blocks to be displayed according to the user position to obtain compensated sub-image blocks; and
obtaining the compensated image signal according to the compensated sub-image blocks, and
wherein the compensating for the plurality of sub-image blocks to be displayed according to the user position to obtain the compensated sub-image blocks comprises:
obtaining a distance from each of sub-image blocks to be displayed to the user position according to the user position, wherein the distance from the sub-image block to be displayed to the user position is a distance from a center point of a geometry graphic of the sub-image block to be displayed that covers the display to the user position; and
compensating for the plurality of sub-image blocks to be displayed respectively according to the distance and a preset formula to obtain the compensated sub-image blocks.

2. The method according to claim 1, wherein the preset formula comprises:

$$A = \left[P \times \left(\frac{a}{b} - 1\right) + 1\right] \times B;$$

where a is a distance from a sub-image block to be displayed, which is compensated for, to the user position; b is a maximum distance from a sub-image block to be displayed to the user position; P is a compensation coefficient, 0≤P≤1; B is an area size of the sub-image block to be displayed, which has a maximum distance to the user position; A is an area size of a compensated sub-image block to be displayed which is compensated for.

3. A display compensation module, comprising:
a receiving unit, configured to receive an image signal to be displayed;
a detecting unit, configured to obtain a user position which is a relative position of a user relative to a display apparatus;
a compensating unit, configured to compensate for the image signal to be displayed according to the user position to obtain a compensated image signal; and
an outputting unit, configured to output the compensated image signal,
wherein the compensating unit comprises:
a converting sub-unit, configured to convert the image signal to be displayed into a plurality of sub-image blocks to be displayed;
a processing sub-unit, configured to compensate for the plurality of sub-image blocks to be displayed according to the user position to obtain compensated sub-image blocks; and
an obtaining sub-unit, configured to obtain a compensated image signal according to the compensated sub-image blocks, and
wherein the processing sub-unit is configured to obtain a distance from each of sub-image blocks to be displayed to the user position according to the user position, wherein the distance from the sub-image block to be displayed to the user position is a distance from a center point of a geometry graphic of the sub-image block to be displayed that covers the display to the user position; and
compensate for the plurality of sub-image blocks to be displayed respectively according to the distance and a preset formula to obtain the compensated sub-image blocks.

4. The module according to claim 3, wherein the preset formula comprises:

$$A = \left[P \times \left(\frac{a}{b} - 1\right) + 1\right] \times B;$$

where a is a distance from a sub-image block to be displayed, which is compensated for, to the user position; b is a maximum distance from a sub-image block to be displayed to the user position; p is a compensation coefficient, 0≤P≤1; B is an area size of the sub-image block to be displayed having a maximum distance to the user position; A is an area size of a compensated sub-image block to be displayed which is compensated for.

5. A display apparatus, comprising the display compensation module according to claim 3.

6. The display apparatus according to claim 5, wherein the display apparatus comprises a display panel, and the display compensation module is located in a non-display area on the display panel.

7. The display apparatus according to claim 5, wherein the preset formula comprises:

$$A = \left[ P \times \left( \frac{a}{b} - 1 \right) + 1 \right] \times B;$$

where a is a distance from a sub-image block to be displayed, which is compensated for, to the user position; b is a maximum distance from a sub-image block to be displayed to the user position; p is a compensation coefficient, $0 \leq P \leq 1$; B is an area size of the sub-image block to be displayed having a maximum distance to the user position; A is an area size of a compensated sub-image block to be displayed which is compensated for.

\* \* \* \* \*